Feb. 3, 1931. E. W. STEVENS 1,791,045
AIR LINE LUBRICATOR
Filed Oct. 1, 1926

INVENTOR.
Edward W. Stevens
BY
Ira L. Nickerson
ATTORNEY.

Patented Feb. 3, 1931

1,791,045

UNITED STATES PATENT OFFICE

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY

AIR-LINE LUBRICATOR

Application filed October 1, 1926. Serial No. 138,861.

This invention relates to devices operating automatically to supply lubricant to fluid pressure lines which supply motive fluid for the operation of motors of the expansible chamber type and tools embodying such motors, as for example rock drills, riveting hammers, hoists, etc.

One object of the invention is to provide simple and practical devices readily adaptable to air supply lines for lubricating air operated motors and tools. Other objects will be apparent from the detailed description which follows.

In order to illustrate the invention one concrete embodiment thereof is shown in the accompanying drawings in which.

Figure 1:
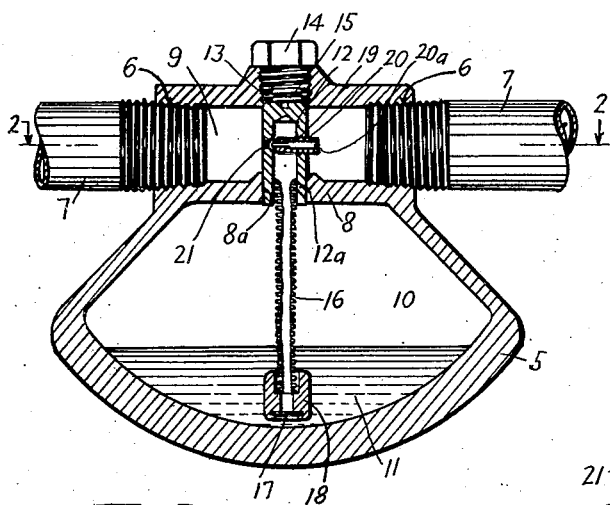
Fig. 1 is a vertical sectional view through a device connected into a motive fluid line, the section being made substantially on the line 1—1 of Fig. 2.

The invention comprises a casing 5 having threaded openings 6 for connecting into a fluid pressure pipe line 7. A partition wall 8 divides the casing into an upper or fluid pressure chamber 9 forming a part of pipe line 7, and a lower lubricant chamber 10 in which a body of liquid lubricant 11 is disposed.

Figure 3:
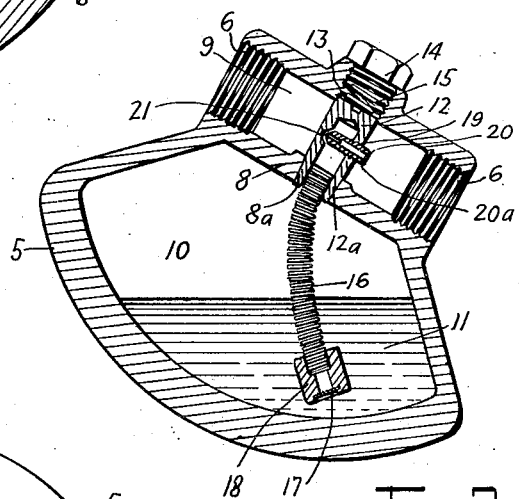
Fig. 3 is a view similar to Fig. 1 showing the device in a different angular position.
Figure 2:
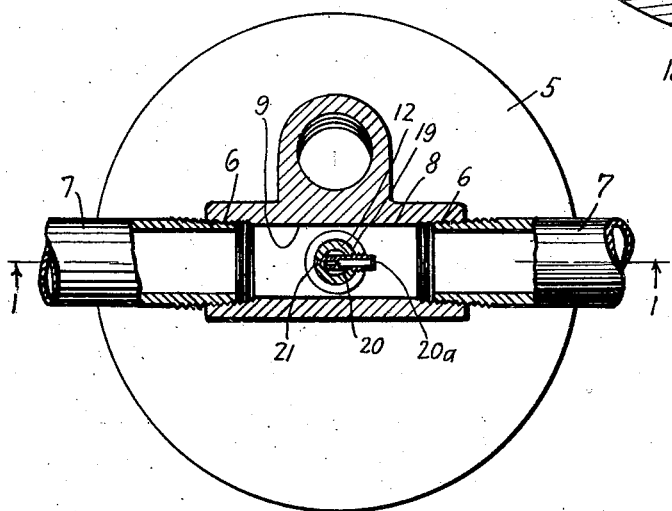
Fig. 2 is a horizontal sectional view from above substantially on the line 2—2 of Fig. 1.

In the center of the air chamber is disposed a hollow cylindrical valve stem 12 insertable through a threaded bore 13 closed by screw plug 14. The lower end 12a of valve stem 12 is beveled or tapered to make an air-tight fit in a complementally tapered bore or port 8a through partition 8. A spring 15 inserted between stem 12 and plug 14 maintains beveled end 12a in its seat. A tube 16 attached to the lower end of the valve stem 12 in any suitable manner extends into chamber 10 to a point adjacent the bottom thereof, a screen 17 being provided over the end of the tube. Tube 16 is preferably of flexible metal soldered to stem 12 in an air tight manner and screen 17 may be mounted in a weight 18 secured to the lower end of the tube. With the described arrangement gravity operates to maintain the lower end of tube 16 always beneath the level of the lubricant 11 in any angular position of the casing, as in Fig. 3.

Centrally of chamber 9 and directed against the stream of fluid in line 7, valve stem 12 has a threaded bore 19 communicating with its interior and receiving lubricant regulating member 20. In line with the bore 19 the opposite wall of stem 12 has a Venturi opening 21 with which the beveled end of member 20 cooperates to throttle or limit the flow of lubricant from chamber 10 induced by the rush of the pressure fluid through chamber 9 and around stem 12. While member 20 may be solid so as to serve as a simple needle valve, it preferably has an axial bore 20a restricted somewhat toward the beveled end of the member so that member 20 serves as an ejector nozzle. The use of an ejector nozzle creates a greater pressure difference between chamber 9 and 10 than is possible with a solid needle valve, and enables the lubricant to be ejected through Venturi opening 21 in the form of a spray or in a finely atomized state. This permits a more intimate mixing of the lubricant with the pressure fluid and better lubrication of the motors and tools to which line 7 extends.

While a preferred form of the invention has been herein shown and described, it is to be understood that the invention is not limited to the specific details thereof but covers all changes, modifications and adaptations within the scope of the appended claims.

I claim as my invention:

1. A lubricator for fluid pressure lines comprising a casing having a partition in its interior dividing the casing into a chamber for lubricant and a chamber forming a part of the fluid pressure line, a hollow stem disposed transversely of the fluid pressure chamber and having its open end in air tight engagement with a port in said partition communicating with said lubricant chamber, a flexible conduit having a weighted end extending from said stem to a point adjacent the bottom of said lubricant chamber, and means including an opening in said stem for causing a flow of lubricant from the lubricant chamber into said fluid pressure chamber.

2. A lubricator for fluid pressure lines comprising a casing having a partition in its interior dividing the casing into a chamber for lubricant and a chamber forming a part of the fluid pressure line, a hollow stem disposed transversely of the fluid pressure chamber and having its open end in air tight engagement with a port in said partition communicating with said lubricant chamber, a flexible conduit having a weighted end and extending from said stem to a point adjacent the bottom of said lubricant chamber, and means including an opening in said stem and an ejector nozzle cooperating with said opening for causing a flow of lubricant from the lubricant chamber into said fluid pressure chamber.

3. A lubricator for fluid pressure lines comprising a casing having a partition in its interior dividing the casing into a chamber for lubricant and a chamber forming a part of the fluid pressure line, said casing having a bore and said partition a tapered port in line with said bore, a hollow valve stem disposed in said bore and extending transversely of said fluid pressure chamber, said stem having a bevelled end fitting said tapered port, a plug closing said bore, a spring interposed between said plug and said stem, a flexible conduit having a weighted end and extending from said stem into said lubricant chamber, and means including a port in said stem communicating with said conduit for producing a pressure difference in said chambers so as to induce a flow of lubricant from said lubricant chamber into said fluid pressure chamber.

4. A lubricator for fluid pressure lines comprising a casing having a partition in its interior dividing the casing into a chamber for lubricant and a chamber forming a part of the fluid pressure line, said casing having a bore and said partition a tapered port in line with said bore, a hollow valve stem disposed in said bore and extending transversely of said fluid pressure chamber, said stem having a bevelled end fitting said tapered port, a plug closing said bore, a spring interposed between said plug and said stem, a flexible conduit having a weighted end and extending from said stem into said lubricant chamber, said stem having a Venturi opening in its wall and a threaded bore diametrically opposed thereto, a needle valve adjustably supported in said last named bore and having a bevelled end cooperating with said Venturi opening to limit the passage of fluid, said valve having a bore therethrough somewhat reduced toward its bevelled end whereby said valve serves as an ejector nozzle and assists in inducing a flow of lubricant from said lubricant chamber into said fluid pressure chamber.

Signed by me at Detroit, in the county of Wayne, and State of Michigan, this 27th day of September, 1926.

EDWARD W. STEVENS.